Jan. 6, 1925.
C. H. PARSONS ET AL
1,522,383
LOW TEMPERATURE EMULSIFICATION OF CHEESE
Filed July 11, 1923
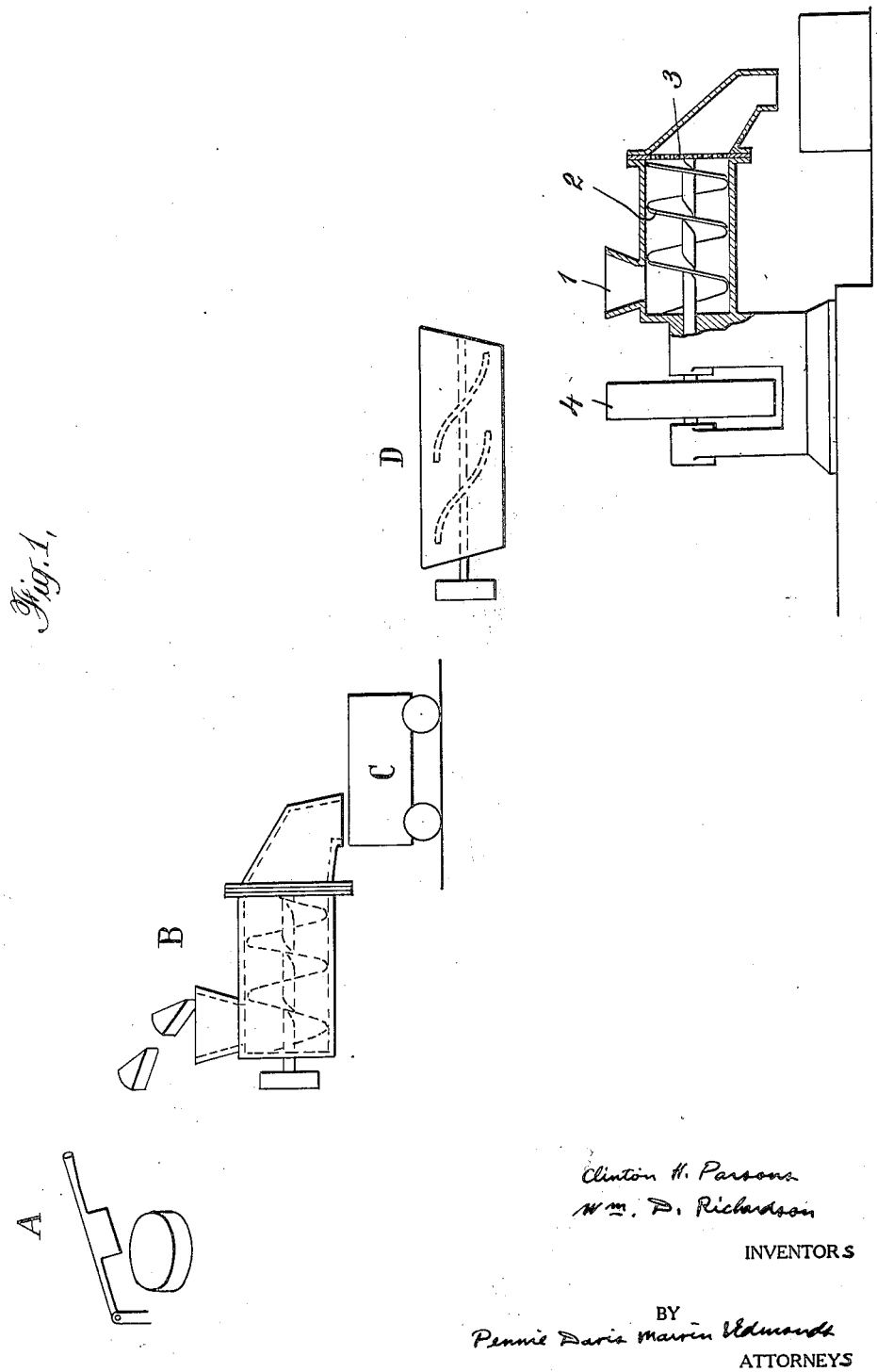

Patented Jan. 6, 1925.

1,522,383

UNITED STATES PATENT OFFICE.

CLINTON H. PARSONS AND WILLIAM D. RICHARDSON, OF CHICAGO, ILLINOIS, ASSIGNORS TO SWIFT & COMPANY, OF CHICAGO, ILLINOIS, A CORPORATION OF ILLINOIS.

LOW-TEMPERATURE EMULSIFICATION OF CHEESE.

Application filed July 11, 1923. Serial No. 650,976.

*To all whom it may concern:*

Be it known that we, CLINTON H. PARSONS and WILLIAM D. RICHARDSON, both citizens of the United States, residing at Chicago, county of Cook, State of Illinois, have invented certain new and useful Improvements in Low-Temperature Emulsification of Cheese; and we do hereby declare the following to be a full, clear, and exact description of the invention, such as will enable others skilled in the art to which it appertains to make and use the same.

The present invention relates to an improved method of emulsifying cheese in the cold or at a low temperature without the application of heat, or at most maintaining the heat at a very moderate temperature, preferably between 95 and 105° F.

The cheese which is treated according to the process of the present invention may be either blended or unblended cheese and without or with additions such as pimento peppers, sage and other flavoring substances, etc. In making a blended cheese, for example, we may first take the cheese as received and proceed to grade it, if not already graded, according to kind, age and flavor, or, if graded, to re-grade it. The cheese is then cut, each kind separately, into coarse blocks, suitable for introduction into the grinding machines; the cheese is then ground in any grinder or hasher, such for example, as a hasher of the Enterprise type. The ground cheese may be received in trucks or suitable vessels, and weighed quantities, together with any admixtures such as pimento peppers, salt, emulsifying agents, powdered milk and the like, introduced into a suitable mixing machine in which the various ingredients are incorporated into an approximately homogeneous mass. The mixed cheese product thus produced may then be used as the material to be subjected to the low temperature emulsification and subsequent pasteurization; although cheese which has not been subjected to the preliminary grinding and mixing operations, but which is suitably comminuted, and blended if desired with other cheese or other admixtures, may be similarly used.

The suitably comminuted and prepared cheese is introduced into an emulsifying apparatus containing the necessary elements to control or provide rapid agitation or whipping or kneading or grinding of the cheese or cheese mixture without the production of a temperature in excess of 110° F. together with means for maintaining the cheese under a sufficient pressure to promote active emulsification, so that the original texture of the cheese will be broken down and destroyed, and a new emulsified texture given to the cheese. The apparatus should advantageously, but not necessarily, include means for propulsion of the cheese or cheese mixture therethrough, in combination with the other features above mentioned. A suitable emulsifying device may be an apparatus such as an Enterprise hasher or the equivalent which is so constructed as to permit the desired emulsification to take place therein. When an Enterprise hasher is employed, it may be provided with a plate having perforations of suitable size therein sufficient to produce a moderate back pressure when the machine is in operation.

When the cheese is introduced into the hopper of the machine, the machine is rotated at a fairly rapid rate in order to accomplish the emulsion, e. g. a rate four to six times as fast as the ordinary rate of rotation. The rate of rotation will vary with the size of the machine, and may be e. g., 500–600 R. P. M. for large machines or 1000–1200 R. P. M. for small machines. The back pressure which is regulated by the perforations of the plate in the machine, or aided by a tapered spout or other means, should be sufficient to prevent the easy slipping of the material as it would ordinarily be effected by the helical screw, so that in addition to the ordinary movement of propulsion, a considerable whipping and beating action is accomplished on the material. This has the effect in a very short time of destroying the original texture of the raw cheese and of producing an excellent emulsion in which the original texture of the cheese is entirely destroyed and a new texture which we term an emulsified texture, given to the cheese such that it can then be softened or melted, as in melting, pasteurizing or sterilizing operations, without material separation of its butter fat content.

We have ascertained that emulsification may not occur when the machine is first started into operation and that a certain time factor is requisite. However, when the emulsion once starts to form, it is able to maintain itself progressively. If the emulsion breaks or active emulsification ceases for any reason, then another period elapses before the emulsification is firmly re-established.

We have also discovered that emulsification can be started with greater ease and rapidity by the introduction into the hopper of cheese which has been previously emulsified, and that, when this is done, the emulsification process goes on in a satisfactory way. When unemulsified cheese is introduced continuously into the machine, the emulsification process propagates itself continuously when once established.

The emulsified cheese manufactured in the manner above described is suitable for packaging as loaf cheese or small package or carton cheese; and it may be discharged from the emulsifying machine directly to the packages, or it may be subjected to further treatment before packaging.

The cheese produced as above described has the important advantage that it can be melted for cooking purposes, as in the manufacture of Welsh rarebit, without butter fat separation or without such separation to a material degree. In this important respect the cheese is distinguished from loaf cheese now on the market and made by other processes.

The cheese resulting from the low temperature emulsification above described is in a particularly advantageous condition for pasteurization or sterilization since, when heat is applied and the cheese is melted, butter fat separation does not occur, or not to a material degree.

The invention will be further described in connection with the accompanying drawings showing an apparatus embodying the invention and adapted for carrying out the process of the invention.

In the accompanying drawings the figure illustrates by conventional showing the preliminary treatment and preparation of the cheese and apparatus adapted for such treatment and preparation and for the low temperature pasteurization.

The different types are cut up into coarse blocks as indicated conventionally at $a$. The cheese is then ground in any suitable grinder or hasher such as that indicated conventionally at $b$. The ground cheese is received in trucks or receptacles and weighed amounts are introduced into the dough mixer $d$ and thoroughly mixed after which the mixture is fed by a suitable feeding device into the hopper 1 of the low temperature emulsifying apparatus.

The emulsifying apparatus is shown conventionally as a machine similar to an Enterprise hasher having a helical screw 2 driven by suitable means such as at 4. At the outlet of the emulsifier is a perforated plate 3 for exerting back pressure on the cheese. The back pressure can be readily varied and regulated as will be readily understood.

As an example of the application of the present process we will refer to the treatment of a mixture made up of the following ingredients:

Pounds.
Full cream cheese_____70
Aged full cream cheese_____20
Pimento peppers_____10

An emulsifying agent such as a small amount of soda or the equivalent may be added if desired. The addition of such an emulsifying agent materially promotes and faciliates the emulsification of the cheese, particularly of cheese which does not readily emulsify without the presence of such an emulsifying agent.

This formula is susceptible of wide variation in producing a final product of uniform flavor. If the full cream cheese is quite fresh, more aged full cream cheese may be added. Such blending of new cheese with aged cheese is advantageous, particularly where an emulsifying agent is not used, and with an emulsifying agent materially assists in giving a uniform product of the desired emulsified texture, avoiding both the stiff texture obtained with new cheese alone and also the objections which old cheese alone presents. On the other hand, if the full cream cheese is older, less aged cheese may be used. In addition to pimento peppers, other flavoring substances may be added, such as salt, vinegar, pepper, sage, sugar, etc. Also for conferring special cheese flavors, other types of cheese may be used in the formula, such as Swiss, Roquefort, Limburger and others.

The different types of cheese are cut up and ground through a hasher and the amounts weighed as indicated. The batch made up of the various ingredients is introduced into a dough mixer and thoroughly mixed, after which it is fed by a feeding device into the hopper of the emulsifier where it is emulsified and converted into a product which can be melted without appreciable separation of butter fat.

This emulsified cheese may itself be the final product of the process and may be packaged and sold as an emulsified and unpasteurized cheese, or it may be subjected to pasteurization or sterilization, for example, in accordance with the combined emulsification and pasteurization process of our companion application, Serial No. 650,974. A modified form of pasteurizing process is described in our companion application Serial No. 650,976; while an apparatus adapted for use in the pasteurization of the preliminary emulsified cheese is set forth in our companion application Serial No. 650,973.

It will thus be seen that the present invention provides a new emulsified cheese product which can be melted for cooking purposes as in the making of Welsh rarebit and that this cheese product, without pasteurization is a satisfactory unpasteurized product, while with subsequent pasteurization, it nevertheless retains its emulsified characteristics. It will also be seen that the invention provides an improved method and apparatus for producing such a new emulsified cheese product, in which the cheese, after preliminary preparation and blending, is subjected in a continuous manner to an emulsifying operation which is so regulated as to back pressure on the cheese during emulsification, speed of rotation of the emulsifying screw, etc. that the new emulsified product will be produced. The new cheese product may be packaged and sold as loaf cheese or it may be boxed, cartoned or tinned and sterilized or pasteurized in the package or it can be pasteurized for example, by a continuous pasteurizing process such as set forth in our companion application Serial No. 650,974 or in a separate or batch process as in the making or Edam or Gouda cheeses and the like. In referring to the new cheese product of the present invention as an emulsified cheese, we mean that the cheese is one in which the original cheese texture and grain have been destroyed and a cheese which, when melted, will assume the state of an emulsion without appreciable butter fat separation.

We claim:

1. The process of preparing cheese which comprises subjecting the cheese to emulsification at a low temperature, below that of pasteurization, and thereby breaking down and destroying the original grain and texture of the cheese and imparting to the cheese an emulsified texture.

2. The process of preparing cheese which comprises subjecting the cheese to emulsification under pressure and at a low temperature below that of pasteurization and thereby breaking down and destroying the original texture of the cheese and imparting to the cheese an emulsified texture.

3. The process of preparing cheese which comprises subjecting the cheese to emulsification with an emulsifying agent at a low temperature below that of pasteurization and thereby breaking down and destroying the original grain and texture of the cheese and imparting to the cheese an emusified texture.

4. The process of preparing cheese of smooth and uniform texture which comprises emulsification of the cheese at a temperature not to exceed 110° F.

5. The process of preparing cheese which comprises grinding the ordinary types of cheese, mixing them in the desired proportions, either with or without condimental substances, and subjecting the ground and mixed product to emulsification under pressure at a low temperature and in a continuous manner.

6. The process of making loaf cheese which comprises grinding the ordinary types of cheese, mixing them in the desired proportions with or without the addition of condimental substances, and passing the resulting ground and mixed product in a continuous manner through a low temperature emulsifying apparatus under pressure and at a low temperature.

7. The method of promoting the emulsification of cheese at low temperature which comprises adding the cheese to cheese which has been previously emulsified and subjecting the mixture to emulsification under pressure.

8. The process of preparing cheese which comprises supplying cheese in a substantially continuous manner to an emulsifying apparatus and causing the cheese to flow progressively through said apparatus, maintaining the cheese under pressure in said apparatus and discharging the cheese continuously therefrom, the cheese being subjected to continuous and progressive emulsification in said apparatus under pressure and the emulsification being regulated to give a continuous yield of emulsified cheese discharged from the apparatus.

9. The method of preparing cheese which comprises supplying the cheese in a substantially continuous manner to an emulsifying apparatus having a screw conveyor therein and causing the cheese to flow progressively therethrough and be discharged continuously therefrom, maintaining a back pressure upon the cheese flowing through said apparatus and subjecting the cheese therein to a whipping and beating action by a rapid rotation of said screw conveyor, whereby the emulsified cheese is produced and discharged from the apparatus in a substantially continuous manner.

10. The method of preparing cheese which comprises grinding the ordinary types of cheese, mixing them in the desired proportions with or without the addition of condimental substances, feeding the resulting mixture in a substantially continuous manner to an emulsifying apparatus and causing the same to flow progressively therethrough and to be discharged in a substantially continuous manner therefrom, subjecting the cheese in said apparatus to agitation by a screw conveyor while maintaining back pressure on the cheese, and regulating the operation to effect progressive and continuous emulsification of the cheese, whereby the emulsified cheese is produced and discharged from the apparatus in a substantially continuous manner.

11. The method of preparing cheese which comprises blending fresh cheese with aged cheese and subjecting the blended cheese to emulsification at a low temperature until the original cheese texture is destroyed and a new emulsified texture imparted to the cheese.

12. The method of preparing cheese which comprises blending fresh cheese with aged cheese and subjecting the blended cheese to emulsification with an emulsifying agent at a low temperature until the original cheese texture is destroyed, and a new emulsified texture imparted to the cheese.

13. A new cheese product, comprising unpasteurized emulsified cheese, in which the original cheese texture has been destroyed and an emulsified texture imparted thereto, said cheese being capable of being melted for cooking purposes as in the making of Welsh rarebit without appreciable butter fat separation.

14. As a new cheese product, a blended cheese, made of a blend of new cheese and aged cheese in which the original cheese texture has been destroyed and an emulsified texture imparted thereto, said cheese being capable of being melted for cooking purposes as in the making of Welsh rarebit without appreciable butter fat separation.

15. A new cheese product, comprising unpasteurized emulsified cheese, in which the original cheese texture has been destroyed and an emulsified texture imparted thereto, said cheese being capable of being melted for cooking purposes as in the making of Welsh rarebit without appreciable butter fat separation, said cheese also containing an emulsifying agent.

16. As a new cheese product, a blended cheese, made of a blend of new cheese and aged cheese in which the original cheese texture has been destroyed and an emulsified texture imparted thereto, said cheese being capable of being melted for cooking purposes as in the making of Welsh rarebit without appreciable butter fat separation, said cheese also containing an emulsifying agent.

17. As a new cheese product, an unpasteurized loaf cheese, made of blended new and aged cheese, the original cheese texture having been destroyed and an emulsified texture imparted to the cheese such that the cheese is capable of being melted as in the making of Welsh rarebit without appreciable butter fat separation.

In testimony whereof we affix our signatures.

CLINTON H. PARSONS.
WILLIAM D. RICHARDSON.